United States Patent Office 2,776,093
Patented Jan. 1, 1957

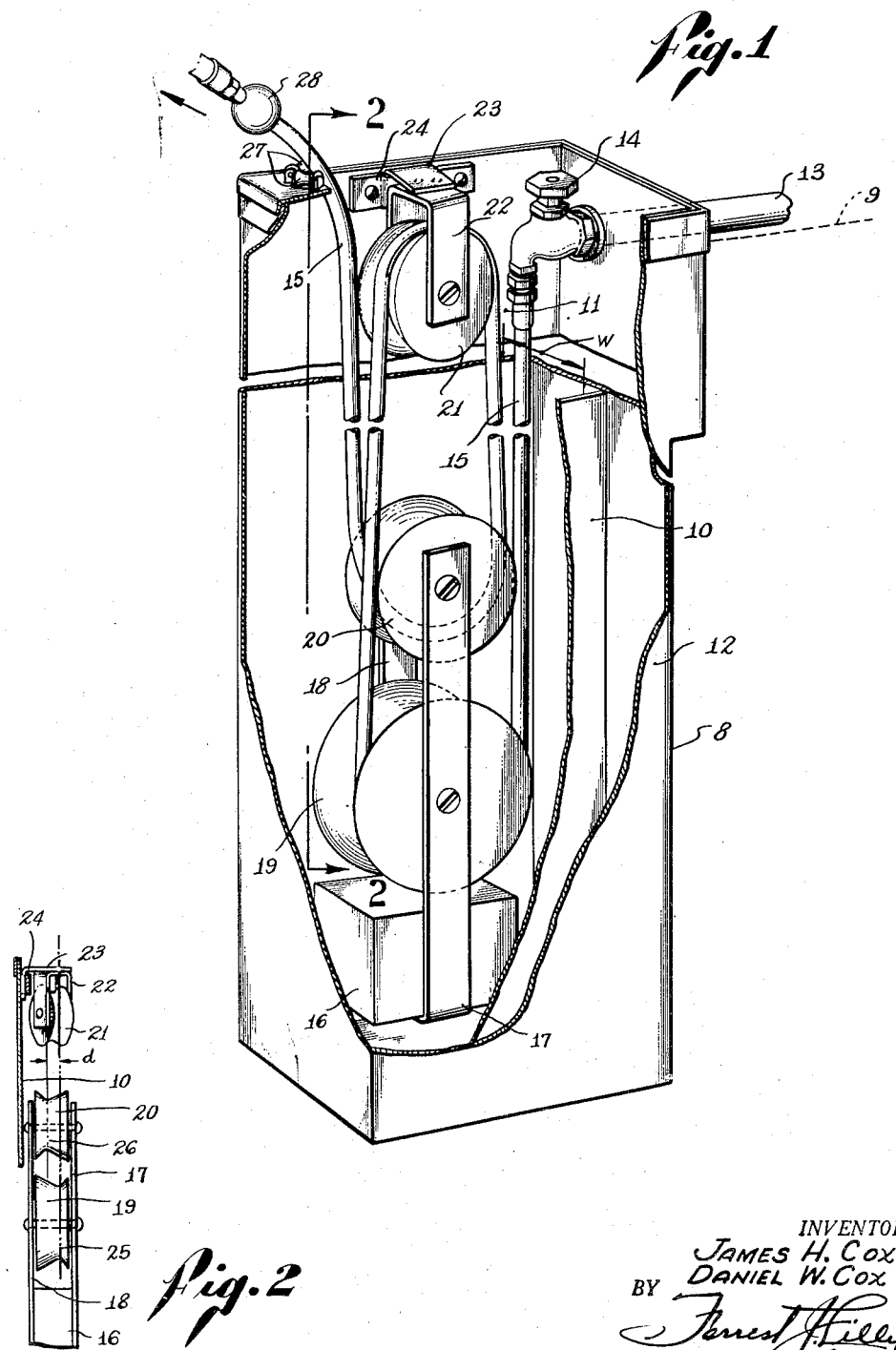

2,776,093

HOSE RETRIEVER

James H. Cox and Daniel W. Cox, Los Angeles, Calif.

Application July 20, 1953, Serial No. 369,097

4 Claims. (Cl. 242—47.5)

This invention relates to apparatus for dispensing gasoline, oil, air, and water at such places as automobile service stations, and more particularly is addressed to an improved arrangement for supporting and storing the dispensing hose.

In United States Patent 2,225,859, filed December 24, 1940, and titled "Dispensing Device," there is disclosed an apparatus for performing the same general functions as the present invention. In this Patent 2,225,859, means are provided for permitting a relatively long length of flexible tubing or hose to be easily withdrawn from a storage casing and automatically retracted therein upon releasing the tubing or hose. The instant case however, contemplates certain improvements over the structure shown in the referred to patent whereby the same length of flexible tubing or dispensing hose may be stored in substantially one-half the space required heretofore. This feature is particularly important and advantageous in that two different dispensing systems, such as one for air and one for water, for example, may be stored in substantially the same amount of space formerly required for one.

It is a primary object of the present invention accordingly, to provide an improved dispensing apparatus in which a given length of dispensing hose may be retractably stored in a confined space.

Another object is to provide improved means for insuring that various portions of the hose will not rub against each other or be subject to undue wear in the withdrawing or retracting operation.

Still another object of the invention is to provide such a dispensing apparatus which is economical to manufacture, extremely reliable in use, and which is rugged, simple, and easy to operate.

A better understanding of the invention will be had by referring to the accompanying drawings in which:

Fig. 1 is a cut away perspective view showing the assembled apparatus in a normal sized casing well; and Fig. 2 is a schematic view of the apparatus as seen along the line 2—2 of Fig. 1.

Referring to Fig. 1, the dispensing apparatus comprises a rectangular casing or well 8 adapted to be buried in the ground whereby only a small portion of the top of the casing is exposed. The ground level is indicated by the dotted line 9. The casing 8 may be longitudinally divided by a partition wall 10, the upper portion of the wall terminating short of the top of the casing as shown and the spacing between this wall and the casing side wall 11 being indicated by W. If desired the rectangular casing may be one-half the size shown, the front side wall being constituted of the partition 10. As shown in the drawing however, the casing is of such a size as to accommodate at least two dispensing devices, a device similar to the one shown being adapted to fit between the partition wall 10 and the front side wall 12 if desired.

In all of the prior art dispensing systems adapted to handle the length of hose supported by the present device, a casing having a width substantially twice the distance W was needed, and if such prior art devices were to be inserted in the casing 8 as shown it would be necessary to remove the partition wall 10, and addition of another dispensing unit would require a casing twice the width of the one shown in Fig. 1.

The supply inlet for the dispensing hose is shown at 13 passing through the top portion of the casing and terminating in a valve 14. The flexible tubing comprising the dispensing hose 15 is adapted to be threadedly secured to and supported by the valve spout.

The supporting apparatus itself comprises a weighted base block 16 straddled by a yoke type support having upwardly extending side arms 17 and 18 journalling a main sheave 19 and an auxiliary sheave 20 disposed above the sheave 19. As shown, the sheave 19 preferably has a larger diameter than the sheave 20.

Adjacent the top of the well there is provided a fixed sheave 21 journalled in an angulated yoke 22 in turn secured to a hook member 23. The member 23 is adapted to hook into a slot formed by a bracket 24 as clearly shown in Fig. 2.

The flexible tubing or dispensing hose 15 passes downwardly into the well over the main sheave 19, upwardly to the fixed sheave 21, thence downwardly around the auxiliary sheave 20 and finally upwardly to pass through the exterior of the top portion of the well.

As shown in Fig. 2 the sheave groove 25 for the main sheave 19 is offset, being closer to one of the supporting arms than the other. In the apparatus illustrated, the offset groove is disposed closer to the arm 17 than the supporting arm 18. Similarly the auxiliary sheave 20 includes an offset groove 26 disposed in an offset direction opposite to that of the groove in the main sheave. Thus groove 26 of the auxiliary sheave is closer to the supporting arm 18 than to the supporting arm 17. The separation $d$ of the planes of these offset grooves is made at least as great as the diameter of the dispensing hose 15. Because of the angulated disposition of the supporting yoke 22 for the fixed sheave 21, the plane of this sheave will be inclined at a slight angle to the plane of the sheaves 19 and 20. Thus the dispensing hose 15 in passing over the fixed sheave 21 will be substantially alined with the offset grooves of the main and auxiliary sheaves.

The free end of the dispensing hose 15 passes over guide rollers 27 and terminates in an enlargement in the form of a rubber ball 28 which prevents the free end of the hose 15 from falling into the well.

Because of the fact that the main sheave 19 and auxiliary sheave 20 are substantially coplanar, the supporting apparatus may be fitted within the confined space between the partition wall 10 and the adjacent side wall 11. On the other hand, if the main sheave and auxiliary sheave were coaxially disposed side by side, a space of substantially twice the size would be required to accommodate the same length of dispensing hose. The close spacing of the side walls confining the sheaves serves as a guide preventing twisting of the two floating sheaves with respect to the fixed sheave.

The feature of the offset groove in the main sheave and auxiliary sheave insures that portions of the dispensing hose will not come into contact during the withdrawing or retracting operation. Furthermore, the slight angulation of the fixed sheave 21 will minimize wear caused by the sheave flanges rubbing on the sides of the dispensing hose.

In operation, the filling station attendant simply grasps the ball 28 to withdraw the dispensing hose from the well. Because of the arrangement of the various sheaves, for every four feet of hose withdrawn, the base weight 16 will move up but one foot. Thus a well casing approximately six feet deep can accommodate approximately twenty-four feet of dispensing hose. After the attendant has performed the necessary service he may simply release the free end of the dispensing hose 28 and the weighted member 16 will cause the hose to be retracted within the casing.

It will be immediately apparent from the foregoing that the dispensing apparatus of the present invention is not only rugged and simply constructed with a minimum number of moving parts, but the arrangement of the various sheaves permits a maximum length of hose to be stored in a minimum space.

We claim:

1. In a dispensing apparatus, the combination including: peripherally grooved main, auxiliary and fixed sheaves; a support rotatably mounting said main and auxiliary sheaves in spaced, coplanar relationship; a flexible tubing successively passing around the main sheave, the fixed sheave, and the auxiliary sheave and positioned in the peripheral grooves in said sheaves; the grooves in the main and auxiliary sheaves being in planes offset a distance at least equal to the diameter of said tubing; the peripheral groove in said fixed sheave lying in a plane inclined to said first mentioned planes at such an angle that the portion of the tubing extending between the main sheave and the fixed sheave will be disposed in the plane of the groove in the main sheave and the portion of the tubing extending between the fixed sheave and the auxiliary sheave will be disposed in the plane of the groove in the auxiliary sheave.

2. The subject matter of claim 1 wherein said auxiliary sheave is disposed between said fixed and main sheaves and has a diameter which is less than that of the main sheave.

3. The subject matter of claim 1 wherein said main and auxiliary sheaves have equal axial dimensions; said support comprising a pair of parallel arms between which the main and auxiliary sheaves are rotatably disposed.

4. The subject matter of claim 3 including a weight carried by said support.

References Cited in the file of this patent

UNITED STATES PATENTS

| | | |
|---|---|---|
| 615,859 | Kraber | Dec. 13, 1898 |
| 1,730,887 | Hempel | Oct. 8, 1929 |
| 1,928,178 | Holmgreen | Sept. 26, 1933 |
| 2,016,935 | Strang et al. | Oct. 8, 1935 |
| 2,026,327 | Sparling | Dec. 31, 1935 |
| 2,225,859 | Cox | Dec. 24, 1940 |

FOREIGN PATENTS

| | | |
|---|---|---|
| 694,502 | Great Britain | July 22, 1953 |